United States Patent
Lee et al.

(10) Patent No.: US 9,034,292 B2
(45) Date of Patent: May 19, 2015

(54) METHOD AND APPARATUS FOR PRODUCING DISILANE THROUGH PYROLYSIS OF MONOSILANE

(71) Applicant: OCI Materials Co., Ltd., Yeongju-si, Gyeongsangbuk-do (KR)

(72) Inventors: Won Ho Lee, Daejeon (KR); Young Ha Song, Cheonan-si (KR); Sam Bong Kwon, Yeongju-si (KR)

(73) Assignee: OCI Materials Co., Ltd. (KR)

( * ) Notice: Subject to any disclaimer, the term of this patent is extended or adjusted under 35 U.S.C. 154(b) by 0 days.

(21) Appl. No.: 14/554,243

(22) Filed: Nov. 26, 2014

(65) Prior Publication Data

US 2015/0078980 A1    Mar. 19, 2015

Related U.S. Application Data

(63) Continuation of application No. PCT/KR2013/001433, filed on Feb. 22, 2013.

(30) Foreign Application Priority Data

Jun. 13, 2012 (KR) .......................... 10-2012-0063102

(51) Int. Cl.
*C01B 33/04* (2006.01)
*B01J 19/24* (2006.01)

(52) U.S. Cl.
CPC ............... *C01B 33/046* (2013.01); *C01B 33/04* (2013.01); *B01J 19/2415* (2013.01); *B01J 2219/24* (2013.01)

(58) Field of Classification Search
CPC ................................... C01B 33/04; B01J 8/00
USPC .......................... 423/347; 422/600, 610, 614
See application file for complete search history.

(56) References Cited

U.S. PATENT DOCUMENTS

| | | |
|---|---|---|
| 6,027,705 A | 2/2000 | Kitsuno et al. |
| 7,906,094 B2 | 3/2011 | Bourasseau et al. |
| 2006/0222583 A1 | 10/2006 | Hazeltine |

FOREIGN PATENT DOCUMENTS

| | | |
|---|---|---|
| JP | 11-260729 A | 9/1999 |
| WO | 2011/122959 A1 | 10/2011 |

OTHER PUBLICATIONS

International Search Report (PCT/KKR2013/001433), WIPO, Jun. 18, 2013.

*Primary Examiner* — Edward Johnson
(74) *Attorney, Agent, or Firm* — Park & Associates IP Law, P.C.

(57) ABSTRACT

An apparatus for producing disilane through pyrolysis of monosilane, includes: a monosilane pyrolysis unit; a solid particle removal unit which removes solid particles generated in the pyrolysis unit; a condensing unit which liquefies and collects unreacted monosilane, and disilane and higher silanes with three (3) to seven (7) silicon atoms as pyrolysis products excluding hydrogen from a gas with the solid particles removed; a first separation unit which separates monosilane from a mixture of the liquefied unreacted monosilane, disilane and higher silanes; and a second separation unit which separates disilane and higher silanes from the mixture with the monosilane removed. In accordance with the present disclosure, disilane can be produced economically and efficiently with high purity through pyrolysis of monosilane.

9 Claims, 12 Drawing Sheets

2) Silane Converison

3) Disilane production

Macroporous ceramic support

METHOD AND APPARATUS FOR PRODUCING DISILANE THROUGH PYROLYSIS OF MONOSILANE

REFERENCE TO RELATED APPLICATIONS

This is a continuation of pending International Patent Application PCT/KR2013/001433 filed on Feb. 22, 2013, which designates the United States and claims priority of Korean Patent Application No. 10-2012-0063102 filed on Jun. 13, 2012, the entire contents of which are incorporated herein by reference.

FIELD OF THE INVENTION

The present disclosure relates to a method and an apparatus for producing disilane through pyrolysis of monosilane, more particularly to a method and an apparatus for producing costly disilane economically through pyrolysis of monosilane at specific temperature, pressure and gas space velocity.

BACKGROUND OF THE INVENTION

Silicon-based semiconductor devices are used in a variety of products indispensable in modern life, including computers, mobile phones, smartphones, automobiles, refrigerators, communication devices and military and aerospace industries.

Monosilane is used to form a polycrystalline silicon thin film in a semiconductor process and an amorphous silicon thin film of a solar cell. As degree of integration of semiconductor devices increases and the so-called linewidth decreases more and more, it becomes difficult to fabricate silicon films with monosilane. In contrast, it is reported that silicon thin films can be formed with disilane or higher silanes at lower temperature or at higher speeds of up to about 20 times at the same temperature because the decomposition temperature is lower than that of the monosilane. Thus, grown silicon thin film is reported to have superior resistance. Accordingly, demand on disilane is increasing gradually as the linewidth of semiconductor devices become narrower. However, disilane costs hundreds times more per unit weight as compared to silane. Therefore, a process allowing production of the commercially valuable disilane in large scale will provide economic advantages to producers of silane, expand application of disilane, and lower the price of semiconductor components and devices fabricated using disilane.

At present, several techniques are available for production of disilane. Hydrolysis of magnesium silicide developed as a process for producing monosilane is not used to produce monosilane anymore because of low competitiveness. Although disilane is produced as a byproduct, this process is not suitable for large-scale production of disilane since a large quantity of silane is accompanied. Disilane is also prepared from hexachlorodisilane or hexaethoxydisilane in a solvent using a reducing agent such as lithium aluminum hydride ($LiAlH_4$). Although the yield of disilane is high, this process is not used for commercial purposes since the starting material, hexachlorodisilane and the reducing agent are expensive and it is difficult to separate the organosilicon compounds produced as a byproduct. Another method of producing disilane is the electric discharge method. Although it is reported that disilane can be obtained with a high yield of 80% or greater, this method has not been commercialized yet because of the difficulty of development of a commercial-scale production apparatus. Another method is to produce disilane from monosilane using a catalyst. For example, monosilane is contacted with an alumina catalyst or a mixed oxide catalyst comprising alumina at 50-400° C. Although the yield of disilane is relatively high, this method requires long reaction time and the reaction rate is not as high as that of a catalytic reaction. In addition, unless the reaction condition is controlled adequately, monosilane may be excessively decomposed on the surface of the catalyst having a large surface area, leading to production of polysilane powder. This pyrolysis-based method also focuses on minimizing the generation of solid particles.

The above-described methods focus on preparation of higher silanes with three (3) to seven (7) silicon atoms from monosilane with less waste of the monosilane. However, they are not suitable for maximizing production of costly higher silanes from relatively inexpensive monosilane. For large-scale production of disilane and higher silanes, an economically effective preparation method is required.

SUMMARY OF THE INVENTION

The present disclosure is directed to providing a method and an apparatus for economically and efficiently producing costly disilane through pyrolysis of monosilane at 400-460° C., 3-5 bar and 60-500 $hr^{-1}$.

In a general aspect, there is provided an apparatus for producing disilane through pyrolysis of monosilane, comprising:

a monosilane pyrolysis unit wherein pyrolysis occurs at a pyrolysis temperature of 400-460° C., a pyrolysis pressure of 3-5 bar and a pyrolysis space velocity of 60-500 $hr^{-1}$;

a solid particle removal unit which comprises a metal filter which removes particles exceeding 0.1 μm in diameter from among solid particles generated in the pyrolysis unit and a ceramic support which is provided behind the metal filter and removes particles 0.1 μm or smaller in diameter;

a condensing unit which liquefies and collects unreacted monosilane, and the reacted pyrolysis products, namely, disilane and higher silanes with three (3) to seven (7) silicon atoms (i.e., $Si_3$-$Si_7$), excluding hydrogen from the gas with the solid particles removed;

a first separation unit which separates monosilane from a mixture of the liquefied unreacted monosilane, disilane and higher silanes with three (3) to seven (7) silicon atoms; and a second separation unit which separates disilane and higher silanes with three (3) to seven (7) silicon atoms from the mixture with the monosilane removed.

In an exemplary embodiment of the present disclosure, the condensing may be achieved by liquid nitrogen.

In an exemplary embodiment of the present disclosure, the separation may be achieved based on boiling point.

In an exemplary embodiment of the present disclosure, the apparatus may further comprise a heat exchange unit which controls temperature of a gas produced in the pyrolysis unit.

In an exemplary embodiment of the present disclosure, the apparatus may further comprise a storage tank which stores disilane.

In another general aspect, there is provided a method for producing disilane, comprising:

pyrolyzing monosilane at a pyrolysis temperature of 400-460° C., a pyrolysis pressure of 3-5 bar and a pyrolysis space velocity of 60-500 $hr^{-1}$;

removing solid particles exceeding 0.1 μm in diameter from among solid particles in a gas generated during the pyrolysis using a metal filter and removing particles 0.1 μm or smaller in diameter using a ceramic support;

liquefying and collecting unreacted monosilane and disilane and higher silanes with three (3) to seven (7) silicon atoms as pyrolysis products excluding hydrogen from the gas with the solid particles removed;

separating monosilane from a mixture of the liquefied unreacted monosilane, disilane and higher silanes with three (3) to seven (7) silicon atoms; and separating disilane and higher silanes with three (3) to seven (7) silicon atoms from the mixture with the monosilane removed.

The method and apparatus for producing disilane through pyrolysis of monosilane according to the present disclosure allow economical and efficient production of high value-added disilane through pyrolysis of monosilane.

DETAILED DESCRIPTION OF THE INVENTION

Figure 1:
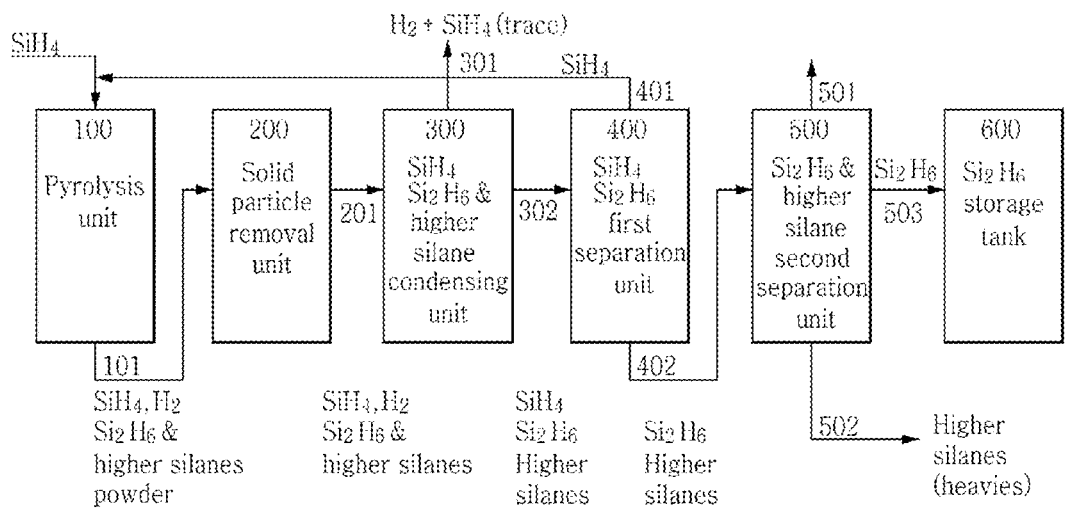
FIGS. 1 and 2 schematically show methods for producing disilane according to exemplary embodiments of the present disclosure.

Hereinafter, exemplary embodiments of the present disclosure will be described in detail so that those of ordinary skill in the art can easily appreciate and practice the present disclosure.

The present disclosure provides an apparatus for producing disilane through pyrolysis of monosilane, comprising: a monosilane pyrolysis unit 100 wherein pyrolysis occurs at a pyrolysis temperature of 400-460° C., a pyrolysis pressure of 3-5 bar and a pyrolysis space velocity of 60-500 $hr^{-1}$; a solid particle removal unit 200 which comprises a metal filter which removes particles exceeding 0.1 µm in diameter from among solid particles generated in the pyrolysis unit and a ceramic support which is provided behind the metal filter and removes particles 0.1 µm or smaller in diameter; a condensing unit 300 which liquefies and collects unreacted monosilane, and disilane and higher silanes with three (3) to seven (7) silicon atoms as pyrolysis products excluding hydrogen from a gas with the solid particles removed; a first separation unit 400 which separates monosilane from a mixture of the liquefied unreacted monosilane, disilane and higher silanes with three (3) to seven (7) silicon atoms; and a second separation unit 500 which separates disilane and higher silanes with three (3) to seven (7) silicon atoms from the mixture with the monosilane removed.

The present disclosure is directed to preparation of higher silanes, in particular disilane. Disilane is mainly used to form films in a semiconductor process. In particular, it is used to deposit poly-Si below a control gate of a flash memory in a 20-nm scale process to ensure contact with an oxide/nitride/oxide (ONO) structure and decrease resistance, thereby improving device performance. In the future semiconductor industry, the semiconductor process is expected to advance to sub-20-nm scales, e.g. a 10-nm scale process. Further, for improvement of productivity, a technique allowing production of disilane which enables a sub-20-nm scale process in high yield is needed in the semiconductor industry. Since the condition where the higher silanes are obtained is different for different species, the present disclosure focuses on the economical production of disilane and provides a method for producing disilane with high yield.

The method for producing disilane according to an exemplary embodiment of the present disclosure is schematically shown in FIG. 1.

The monosilane pyrolysis unit pyrolyzes monosilane. Monosilane is fed into the pyrolysis unit replenishes the pyrolyzed monosilane and is recycled after the pyrolyzed and unreacted monosilane are separated. The pyrolysis unit may be a tubular reactor consisting of one or more tube, but is not limited thereto.

The pyrolysis product of monosilane comprises unreacted monosilane (boiling point=−112° C.), disilane (boiling point=−14° C.), higher silanes (with three (3) to seven (7) silicon atoms) comprising trisilane (boiling point=53° C.), hydrogen (boiling point=−253° C.) and solid particles sub-micrometer to hundreds of micrometers in size. The conversion rate of monosilane and the distribution of the product are affected by the operation parameters of the pyrolysis reactor comprising reaction temperature, reaction pressure and residence time.

In the present disclosure, the higher silanes refer to silanes with three (3) to seven (7) silicon atoms, excluding monosilane and disilane.

The solid particles are solid particles of sub-micrometer to hundreds of micrometers in size generated during pyrolysis.

The mechanism whereby disilane is produced through pyrolysis of monosilane is as follows.

Overall reaction:

$$2SiH_4 \leftrightarrow Si_2H_6 + H_2 (\Delta H° = 12 \text{ kJ/mol})$$

Decomposition of silane by step:

$$SiH_4 \rightarrow SiH_2 + H_2$$

$$SiH_4 + SiH_2 \leftrightarrow Si_2H_6 \rightarrow SiH_2SiH_2 + H_2$$

$$SiH_2 + Si_2H_6 \leftrightarrow Si_3H_8 \rightarrow SiH_3SiH + SiH_4$$

$$SiH_2 + Si_3H_8 \leftrightarrow Si_4H_{10}, \ldots$$

Generation of solid particles:

$$SiH_4 \rightarrow Si_nH_{2n+2} \rightarrow Si_nH_{an} \rightarrow \text{solid particles(aerosol particles)}, (a \leq 2)$$

As described in the mechanism, 1 mol of monosilane ($SiH_4$) is pyrolyzed to give 1 mol of $H_2$ and 1 mol of $SiH_2$ (silylene) as reactive species. The 1 mol of $SiH_2$ (silylene) is combined with 1 mol of $SiH_4$ to give disilane ($Si_2H_6$) as intermediate. Subsequently, higher silanes with three (3) to seven (7) silicon atoms are polymerized through chain reactions and they combine with unsaturated silicon hydride to give solid particles.

Since the energy required to break the Si—H bonding is lower than that is necessary to break the Si—Si bonding, the reaction whereby hydrogen is released from monosilane to form saturated or unsaturated silicon is thermodynamically more favorable than the reaction whereby higher silane is formed through polymerization.

The present disclosure provides a pyrolysis temperature of 400-460° C., a pyrolysis pressure of 3-5 bar and a pyrolysis space velocity 60-500 $hr^{-1}$ as conditions optimized to pyrolyze monosilane and solve the thermodynamic problem. Under these temperatures, pressure and space velocity conditions, superior monosilane conversion rate, disilane selectivity, and disilane yield can be obtained.

Specifically, in the pyrolysis unit, the pyrolysis may occur at 400-460° C. If the reaction temperature is below 400° C., monosilane conversion rate and disilane production amount are very low. And, if the reaction temperature is above 460° C., the solid particles are generated excessively. The reaction temperature may be maintained by electrically heating the pyrolysis unit or by any other known method.

Specifically, the pyrolysis pressure in the pyrolysis unit may be 3-5 bar. According to the study performed by the inventors of the present disclosure, it is preferred that the monosilane pyrolysis pressure is maintained at a gauge pressure of 3-5 bar. Particularly, a pressure of 3-5 bar is preferred when considering the pressure drop during the separation and purification following the reaction. If the pressure is below 3 bar, monosilane conversion rate is too low. And, if it exceeds 5 bar, disilane production may be negatively affected because too much hydrogen is produced.

For example, according to the study performed by the inventors of the present disclosure, when the reaction pressure was 5 bar as a gauge pressure, the highest disilane yield was achieved at a reaction temperature of 440° C. and, above 460° C., the production of disilane decreased and the generation of solid particles and hydrogen increased rapidly.

In the present disclosure, the pyrolysis gas space velocity of the pyrolysis unit may be 60-500 $hr^{-1}$. The gas space velocity (SV) refers to the amount of monosilane entering the pyrolysis reactor per hour measured at the inlet of the reactor divided by the reactor volume. If the space velocity is increased by increasing the feed amount of monosilane, the generation of the solid particles is decreased but the production of disilane does not increase significantly and the amount of unreacted monosilane to be recycled increases greatly. Accordingly, the reactor volume should be very large.

That is to say, the pyrolysis unit of the present disclosure is to be determined considering the production amount of disilane, the generation of solid particles, the recycling amount of unreacted monosilane, or the like. In the present disclosure, monosilane is pyrolyzed under the condition of a pyrolysis temperature of 400-460° C., a pyrolysis pressure of 3-5 bar and a pyrolysis space velocity of 60-500 $hr^{-1}$ to produce solid particles, disilane and higher silanes with three (3) to seven (7) silicon atoms. Thus, since solid particles are inevitably generated in order to maximize the production of disilane, it is necessary to effectively remove the solid particles after the pyrolysis.

If the pyrolysis unit is operated under a condition where solid particles are not generated, the consumption of monosilane by the solid particles and process troubles such as line blocking may be minimized. But, considering that the price of disilane is hundreds of times higher than that of monosilane, it is the most effective and economical to operate the pyrolysis unit under a condition where the production of disilane is maximized even if solid particles are generated. The temperature, pressure and space velocity conditions of the present disclosure are those under which monosilane are pyrolyzed the most economically with generation of solid particles.

Figure 2:
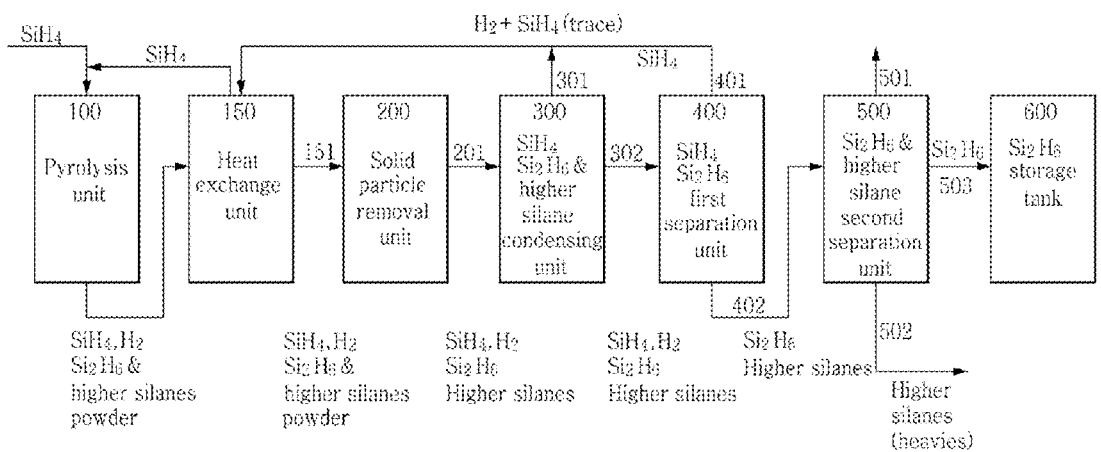

The apparatus for producing disilane of the present disclosure may further comprise a heat exchange unit which controls temperature of a gas produced in the pyrolysis unit as shown in FIG. 2. Specifically, cooling may be performed before the product flows from the heat exchange unit to the solid particle removal unit.

The solid particle removal unit serves to remove the solid particles generated in the pyrolysis unit. Effective removal of the solid particles prevents process troubles caused by the solid particles in the following processes. Further, sub-micrometer particles remaining in the final disilane product may result in problems in a semiconductor process where the disilane gas is used.

Figure 15:
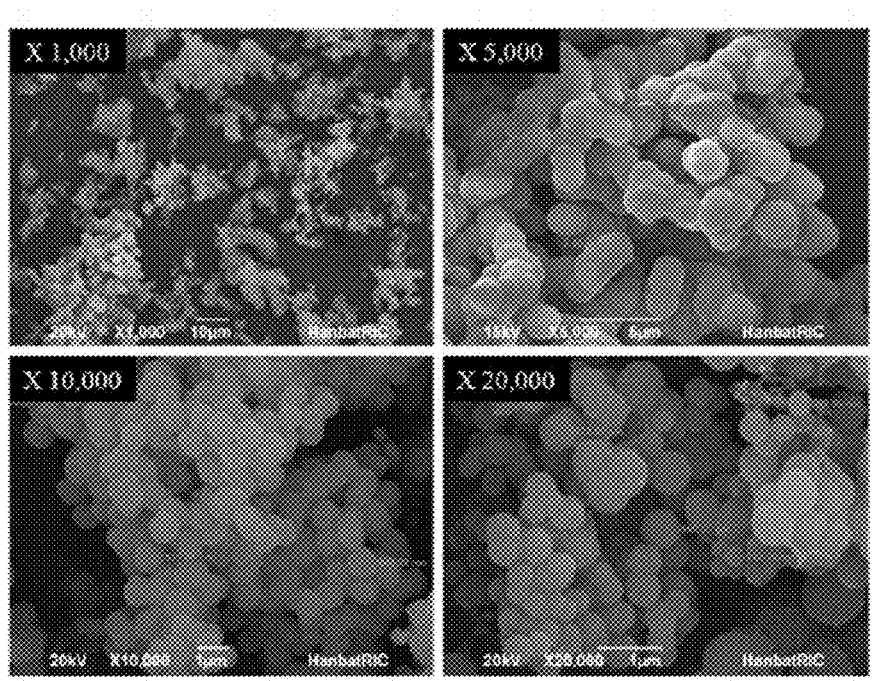
FIG. 15 shows SEM images of solid particles generated during pyrolysis in a method for producing disilane according to an exemplary embodiment of the present disclosure.
Figure 16:
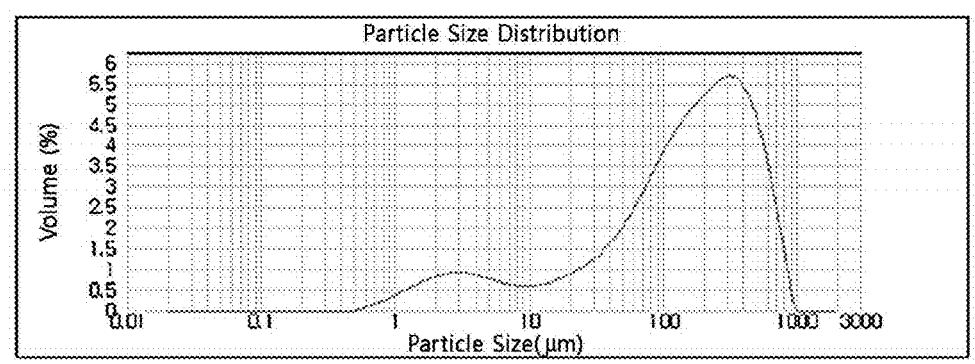
FIG. 16 shows particle size distribution of solid particles generated during pyrolysis in a method for producing disilane according to exemplary embodiments of the present disclosure.

The inventors of the present disclosure have identified that about 1% of solid particles tens to hundreds of nanometers in size are generated during the pyrolysis of monosilane, as shown in FIG. 15. The particle size distribution of the generated solid particles is shown in FIG. 16 and Tables 1 and 2. Since the pyrolysis of silane occurs via chain reactions as described above, solid particles are generated during the process. Because the solid particles may lead to decreased disilane yield and process troubles as impurities, they need to be removed for quality control of disilane.

TABLE 1

| Particle size distribution of solid particles generated during pyrolysis | |
|---|---|
| Item | Particle size (μm) |
| D10 | 6.633 |
| D50 | 164.8 |
| D90 | 517.0 |

TABLE 2

Quantitative analysis of solid particles generated during pyrolysis

| Particle size (μm) | Vol. % |
|---|---|
| <0.631 | 0.06 |
| <1.096 | 0.96 |
| <5.012 | 8.69 |

Figure 17:
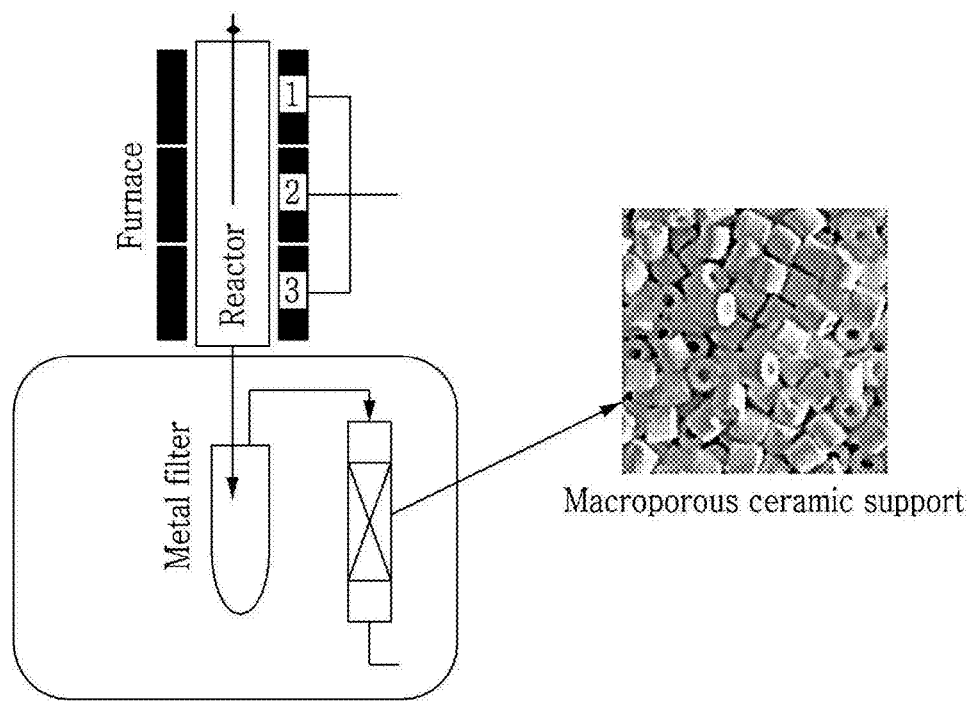
FIG. 17 shows a solid particle removal unit of an apparatus for producing disilane according to an exemplary embodiment of the present disclosure.

Therefore, the method according to the present disclosure comprises removing the generated solid particles using a solid particle removal unit which comprises a metal filter which removes particles exceeding 0.1 μm in diameter from among solid particles generated in the pyrolysis unit and a ceramic support which is provided behind the metal filter and removes particles 0.1 μm or smaller in diameter (see FIG. 17). That is to say, the removal of the solid particles in the present disclosure occurs in two stages. Particles exceeding 0.1 μm in diameter are removed first by the metal filter and then particles 0.1 μm or smaller in diameter are removed the ceramic support equipped behind the metal filter. As a result, solid particles of various sizes can be separated and effectively prevented from being comprised in the final product.

The solid particle removal unit 200 removes only the solid particles comprised in a gas flow 101 discharged from the exit of the pyrolysis unit and passes other gas product. The removal of the solid particles from the gas flow may be achieved by any known method without particular limitation. For example, a cyclone, a metal filter, etc. may be used to capture the solid particles. However, since it is difficult to remove particles 0.1 μm or smaller in size using a usual commercially available metal filter, a trap consisting of a ceramic support having a controlled pore size may be equipped behind the metal filter to remove the particles 0.1 μm or smaller in size. It may be economical to use a filter that can be periodically recycled. In addition, for example, the solid particles may be removed by passing the gas comprising the solid particles through a scrubbing tower that sprays pure water or an aqueous solution that dissolves the solid particles. In this case, an adsorption tower may be equipped to remove the water or the aqueous solution that dissolves the solid particles.

Figure 18:
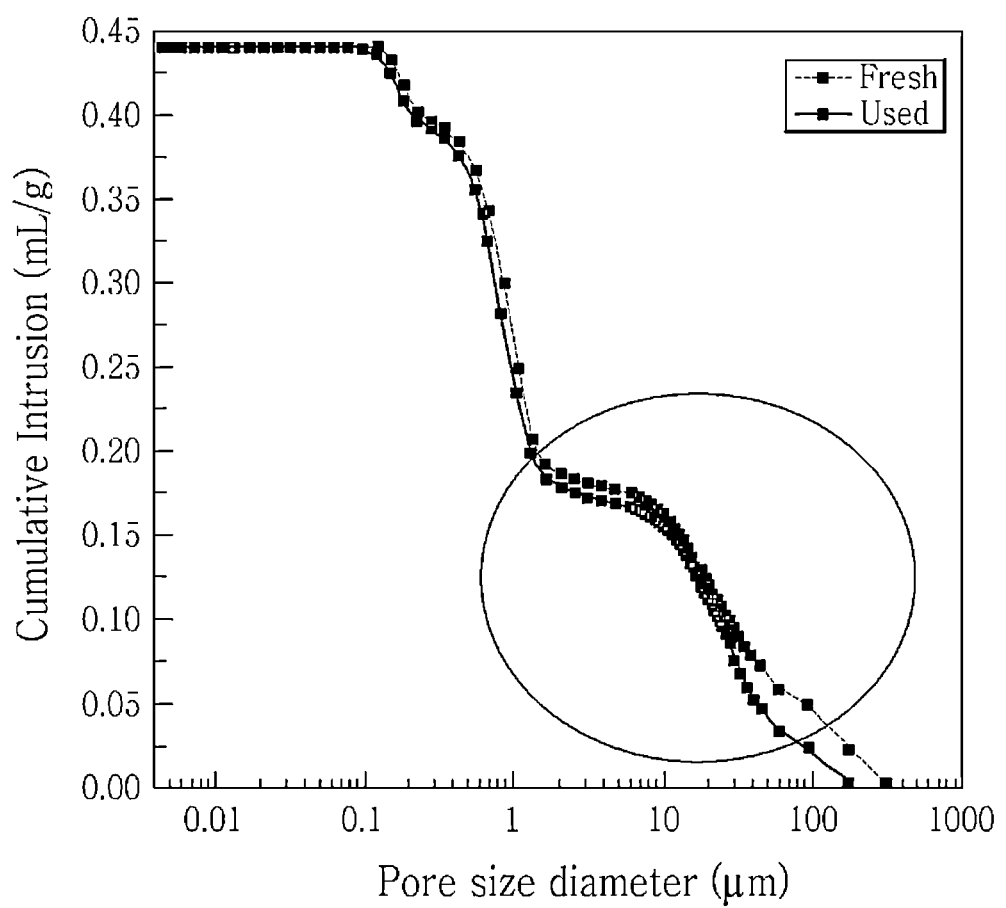
FIG. 18 shows change in porosity of a ceramic support in a method for producing disilane according to an exemplary embodiment of the present disclosure.

The ceramic support is a macroporous ceramic support having a controlled pore size. The ceramic support of the present disclosure has fine solid particles deposited on pores 1 μm or smaller in size and thus has a variable pore size. The change in the porosity of the ceramic support is shown in FIG. 18. That is to say, the solid particles 1 μm or smaller in size that are difficult to separate can be effectively separated using the macroporous ceramic support.

The condensing unit serves to liquefy and collect unreacted monosilane and disilane and higher silanes with three (3) to seven (7) silicon atoms as pyrolysis products excluding hydrogen from the gas with the solid particles removed. A gas flow 201 discharged from the solid particle removal unit 200 that removes the solid particles comprises unreacted monosilane, hydrogen, disilane and higher silanes with three (3) to seven (7) silicon atoms. It is transferred to the condensing unit 300 so as to liquefy the gas excluding hydrogen.

Specifically, the liquefaction (condensation) may be achieved using liquid nitrogen (boiling point=−196° C.). However, any known liquefaction method may be employed without being limited thereto. The unliquified hydrogen and trace amount of oxygen and monosilane comprised in the gas may be discharged as a gas flow 301 and transferred to an incinerator furnace.

The first separation unit 400 separates monosilane from a mixture of the liquefied unreacted monosilane, disilane and higher silanes with three (3) to seven (7) silicon atoms. A liquefied gas 302 collected by the condensing unit is transferred to the first separation unit 400. The first separation unit 400 may separate monosilane 401 and a liquid 402 comprising disilane and higher silanes with three (3) to seven (7) silicon atoms based on the difference in physical properties of monosilane and higher silane. Specifically, the monosilane and the higher silanes comprising disilane may be separated based on the difference in boiling point, but without being limited thereto. The reason why hydrogen, silane, and higher silanes comprising disilane are not separated simultaneously by the condensing unit 300 based on boiling point but the first separation unit is used is because the amount of disilane comprised in the stream of monosilane may increase since the amount of disilane comprised in the gas is relatively much smaller as compared to monosilane.

Subsequently, the mixture with monosilane removed is passed through the second separation unit which separates disilane and higher silane comprised in the mixture. The second separation unit 500 may separate disilane from trisilane or higher silanes based on the difference in boiling point. For example, the second separation unit 500 may separate the mixture into three gas flows 501, 502, 503. That is to say, as seen from FIG. 1, trace amount of monosilane remaining in higher silane 402 may be discharged as a gas flow 501 and liquefied trisilane or higher silanes may be collected as a gas flow 502 and may be separated or wasted after passing through a distillation tower.

The apparatus for producing disilane according to the present disclosure may further comprise a storage tank which stores disilane. Specifically, disilane 503 discharged from the second separation unit may be transferred to and stored in a storage tank 600 maintained at low temperature before being filled into a cylinder.

The present disclosure further provides a method for producing disilane, comprising: pyrolyzing monosilane at a pyrolysis temperature of 400-460° C., a pyrolysis pressure of 3-5 bar and a pyrolysis space velocity of 60-500 $hr^{-1}$; removing solid particles exceeding 0.1 μm in diameter from among solid particles in a gas generated during the pyrolysis using a metal filter and removing particles 0.1 μm or smaller in diameter using a ceramic support; liquefying and collecting unreacted monosilane and disilane and higher silanes with three (3) to seven (7) silicon atoms as pyrolysis products excluding hydrogen from the gas with the solid particles removed; separating monosilane from a mixture of the liquefied unreacted monosilane, disilane and $Si_3$-$Si_7$ higher silane; and separating disilane and higher silanes with three (3) to seven (7) silicon atoms from the mixture with the monosilane removed.

In accordance with the present disclosure, production of costly disilane with high purity through pyrolysis of monosilane can be maximized. The present disclosure enables economical and effective preparation of disilane, which is difficult to produce in high yield, with maximized yield under specific temperature, pressure and space velocity conditions. The pyrolysis under the condition optimized for obtaining disilane has not been known previously. The present disclosure allows production of disilane with remarkably superior yield as compared to the production of higher silane through simple heat treatment under unspecified conditions.

Hereinafter, the present disclosure will be described in detail through examples. However, the following examples are for illustrative purposes only and it will be apparent to those of ordinary skill in the art that the scope of the present disclosure is not limited by the examples.

Example 1

Monosilane Conversion, Disilane Yield and Solid Particle Generation Amount Depending on Space Velocity and Temperature Monosilane was fed into a vertical SUS tubular reactor (inner diameter 1.09 cm, length 50 cm) consisting of independently controllable 3 stages heated by an electric furnace. With the pressure inside the reactor maintained at 5 bar, monosilane conversion, disilane yield and solid particle generation amount were measured while varying reaction temperature and space velocity. FIGS. 3-6 show expected results of continuous operation for 330 days using a reactor scaled up to a volume of 250 L.

Figure 3:
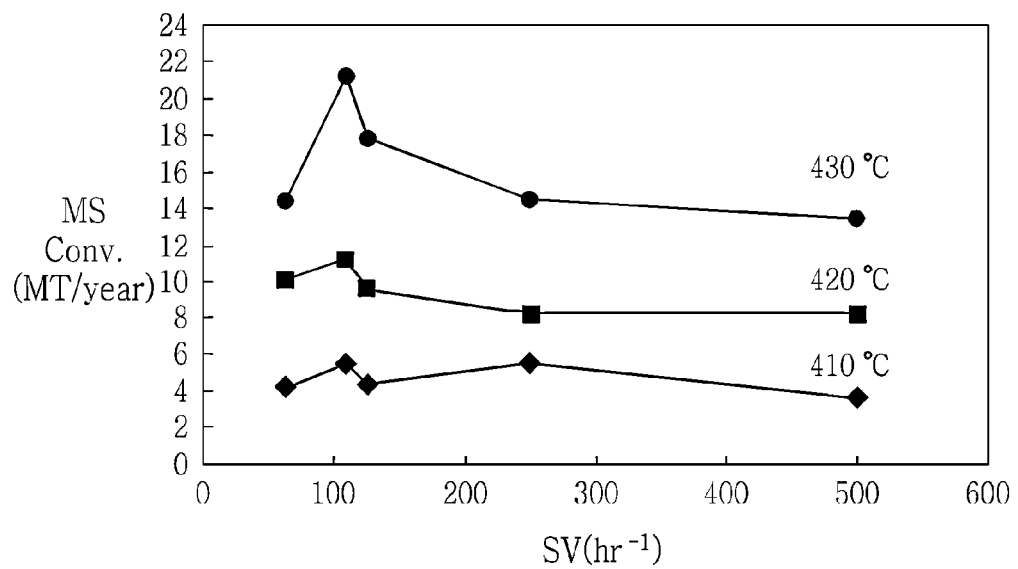
FIG. 3 shows consumption amount of monosilane depending on space velocity in a method for producing disilane according to an exemplary embodiment of the present disclosure.

FIG. 3 shows consumption amount of monosilane depending on space velocity at reaction temperatures of 410° C., 420° C., and 430° C. It can be seen that the consumption amount of monosilane is more sensitive to the change in temperature than the change in space velocity.

Figure 4:
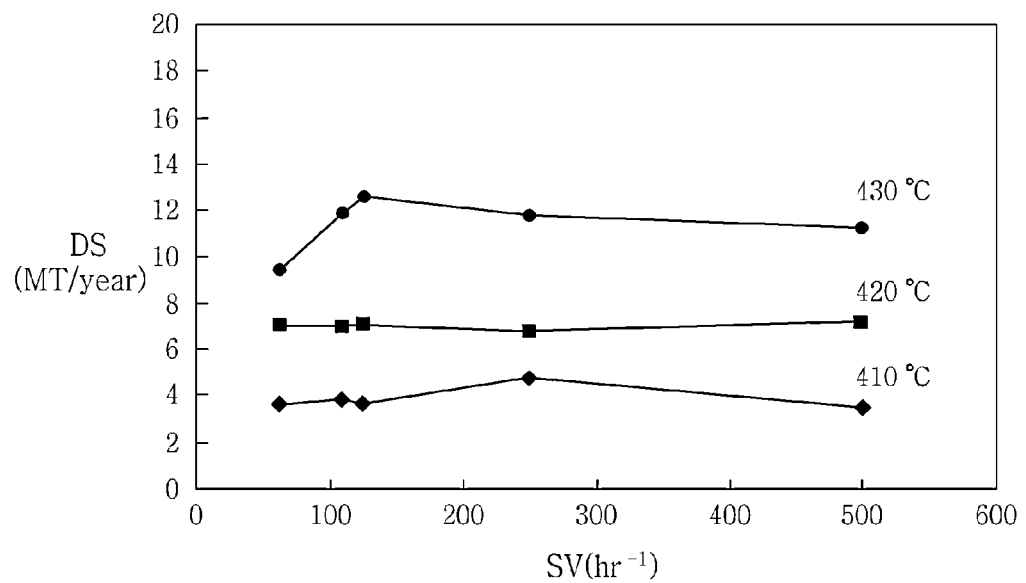
FIG. 4 shows production amount of disilane depending on space velocity in a method for producing disilane according to an exemplary embodiment of the present disclosure.

FIG. 4 shows production amount of disilane produced from the consumed monosilane. The disilane production amount also does not change significantly as the space velocity changes from 60 to 500, but changes significantly with temperature at the same space velocity. At 430° C., the disilane production amount increases as the space velocity changes from 60 to 125 but decreases as the space velocity increases further.

Figure 5:
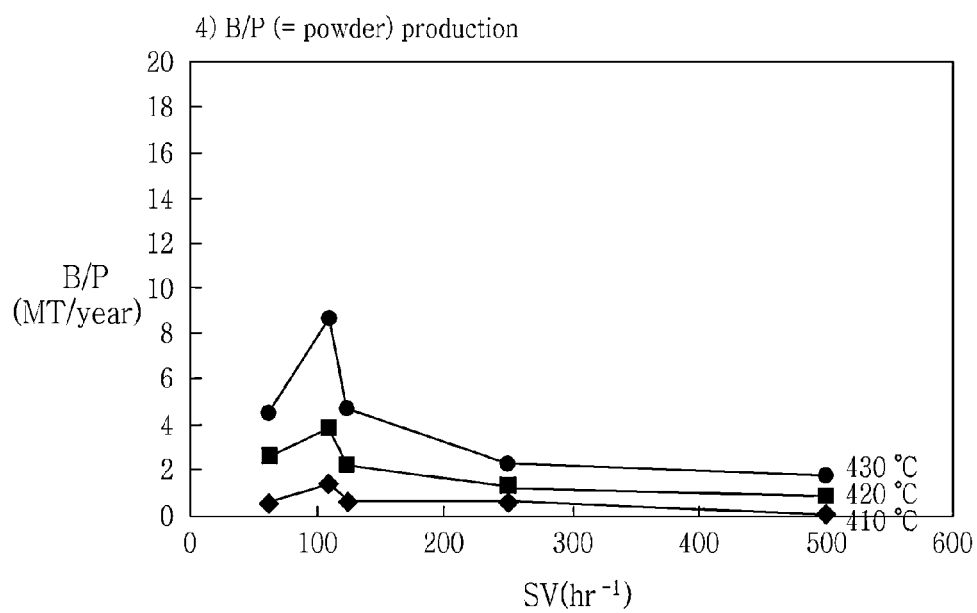
FIG. 5 shows generation amount of solid particles depending on space velocity in a method for producing disilane according to an exemplary embodiment of the present disclosure.

FIG. 5 shows generation amount of solid particles. The solid particle generation amount tends to decrease as the space velocity increases and the change in the solid particle generation amount with the space velocity is larger at higher reaction temperature.

Figure 6:
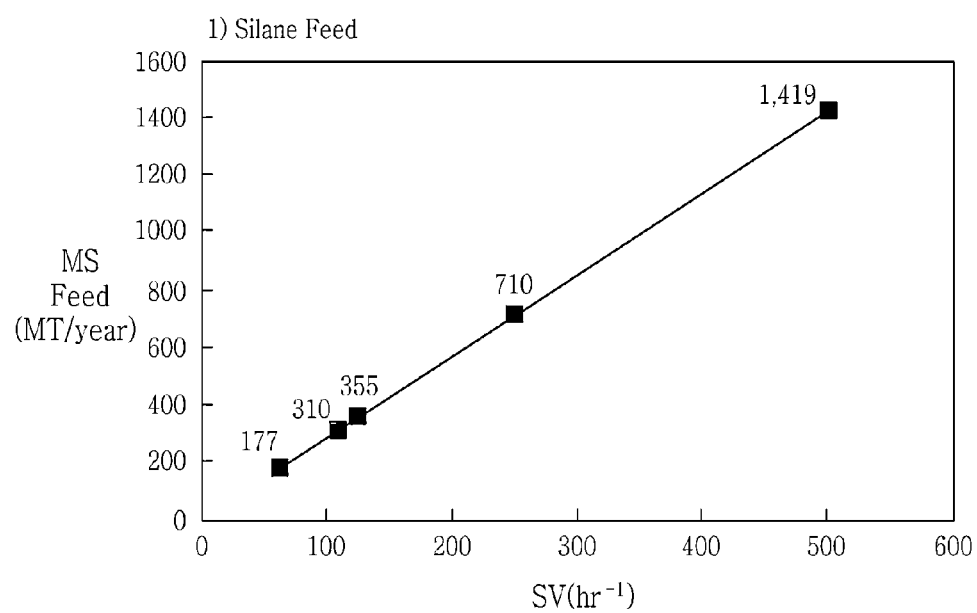
FIG. 6 shows amount of monosilane fed into a reactor depending on space velocity in a method for producing disilane according to an exemplary embodiment of the present disclosure.

FIG. 6 shows amount of monosilane fed into the reactor depending on space velocity. The amount of monosilane excluding the consumption amount of monosilane shown in FIG. 3 is recovered as unconverted monosilane and then fed again into the reactor. Accordingly, the amount of monosilane fed into the reactor increases proportionally with the space velocity, which incurs increased investment cost since the amount of unreacted monosilane to be processed in the following process increases.

Example 2

Monosilane Conversion, Disilane Yield and Solid Particle Generation Amount Depending on Pressure and Temperature The change in monosilane feed amount, monosilane consumption amount, disilane production amount and solid particle generation amount with reaction temperature was observed for the same reactor as in Example 1 at a constant space velocity (SV=109 $hr^{-1}$) and reactor pressures of 1 bar, 3 bar and 5 bar.

Figure 7:
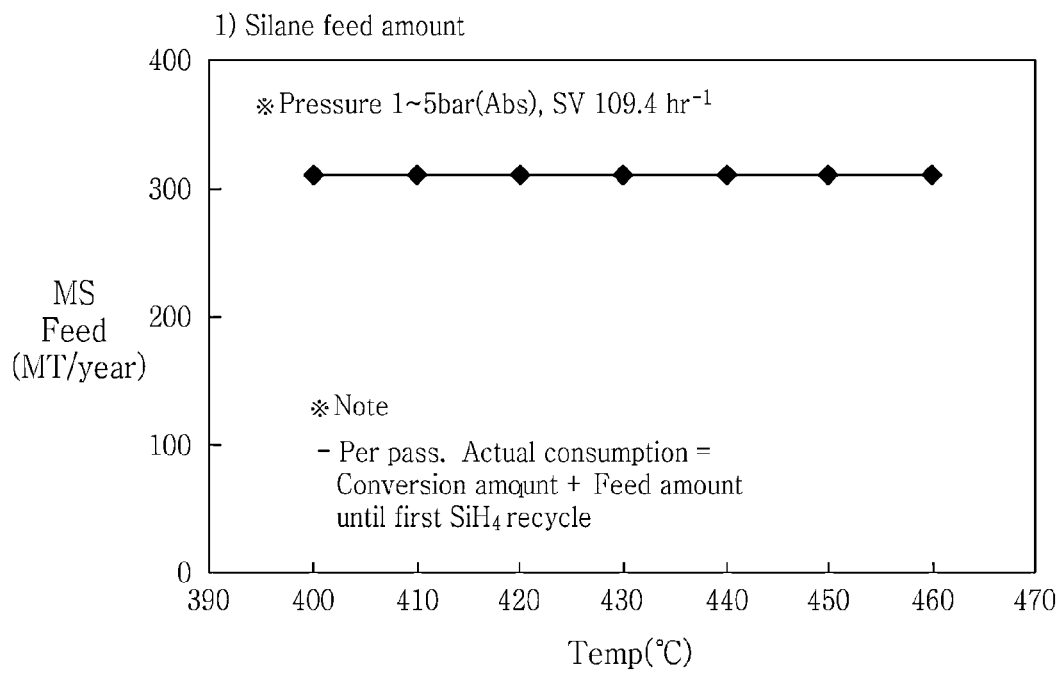
FIG. 7 shows amount of monosilane fed into a reactor depending on temperature in a method for producing disilane according to an exemplary embodiment of the present disclosure.

From FIG. 7, it can be seen that the amount of monosilane fed into the reactor is about 310 tons per year regardless of the reaction temperature.

Figure 8:
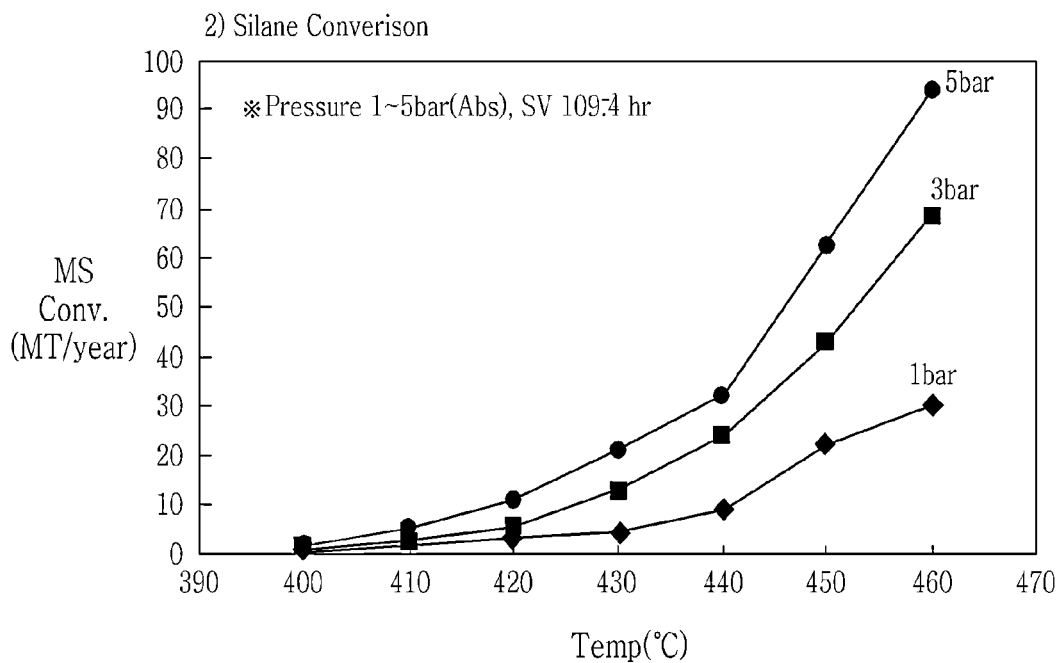
FIG. 8 shows consumption amount of monosilane depending on temperature in a method for producing disilane according to an exemplary embodiment of the present disclosure.

From FIG. 8, it can be seen that the monosilane consumption amount, i.e. the monosilane conversion, increases as the reactor temperature increases for the same reaction pressure. Also, it can be seen that the monosilane consumption amount increases as the reaction pressure increases for the same reaction temperature.

Figure 9:
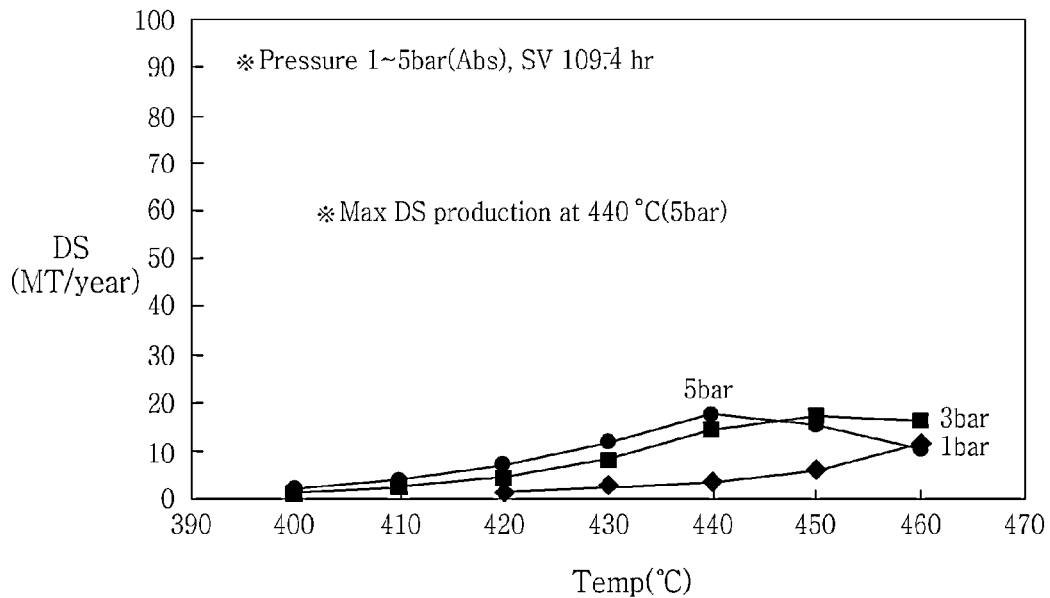
FIG. 9 shows production amount of disilane depending on temperature in a method for producing disilane according to an exemplary embodiment of the present disclosure.

FIG. 9 shows production amount of disilane depending on reaction temperature. It can be seen that the disilane production amount shows different behavior for different reaction pressure. When the reaction pressure is 1 bar, the disilane production amount increases consistently as the reaction temperature increases. At 3 bar, the disilane production amount increases until the reaction temperature increases to 400-450° C. and then decreases. At 5 bar, the disilane production amount is the highest at 440° C.

Figure 10:
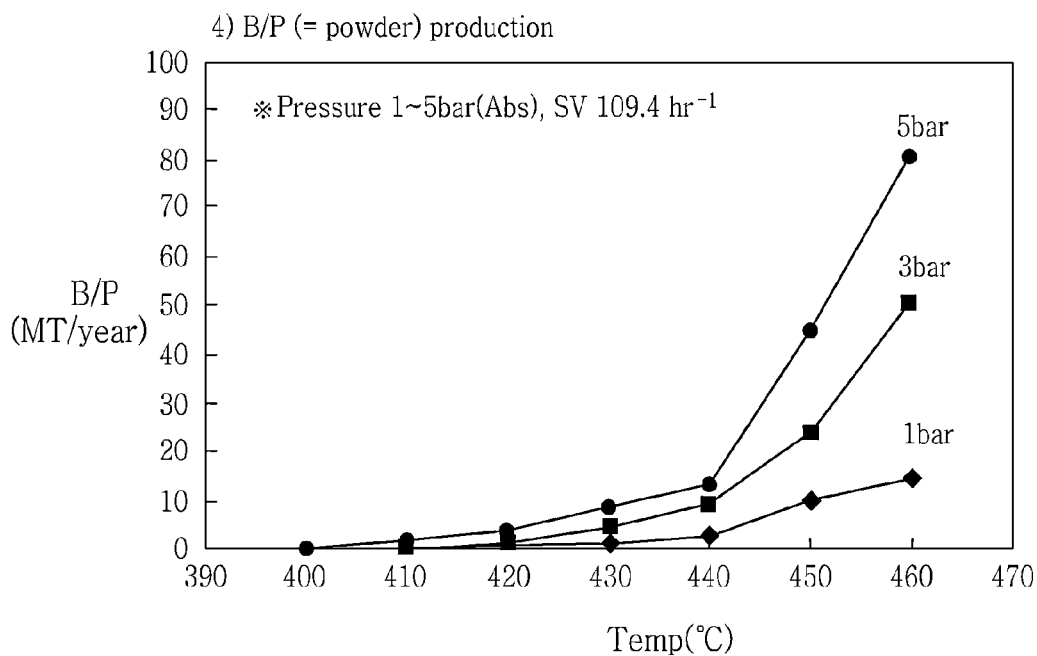
FIG. 10 shows generation amount of solid particles depending on temperature in a method for producing disilane according to an exemplary embodiment of the present disclosure.

FIG. 10 shows generation amount of solid particles depending on reaction temperature for each reactor pressure. It can be seen that the solid particle generation amount increases slowly until the reaction temperature increases to 440° C. and then decreases rapidly at higher temperature. Accordingly, it is thought that the rapid increase in the consumption amount of monosilane above 440° C. observed in FIG. 4 is caused mainly by the generation of the solid particles rather than the production of disilane.

Table 3 summarizes the change in disilane production amount, solid particle generation amount and profit [disilane production amount (ton/yr)×disilane price ($/ton)−silane consumption amount (ton/yr)×silane price ($/ton)] depending on reaction pressure and temperature when the space velocity is 109 $hr^{-1}$. The monosilane price and disilane price were assumed to be $55.7/kg and $5,000/kg, respectively.

TABLE 3

|  | 1 bar | | | 3 bar | | | 5 bar | | |
| --- | --- | --- | --- | --- | --- | --- | --- | --- | --- |
|  | Disilane (ton/yr) | Solid particles (ton/yr) | $ (Mil.) | Disilane (ton/yr) | Solid particle (ton/yr) | $ (Mil.) | Disilane (ton/yr) | Solid particles (ton/yr) | $ (Mil.) |
| 440° C. | 6.1 | 2.7 | 30.0 | 14.2 | 9.3 | 69.8 | 17.5 | 13.3 | 85.5 |
| 450° C. | 11.8 | 9.9 | 57.7 | 17.4 | 24.0 | 84.7 | 15.6 | 44.9 | 74.3 |
| 460° C. | 14.7 | 14.6 | 72.0 | 16.1 | 50.3 | 76.8 | 10.3 | 80.3 | 46.4 |

As can be seen from Table 3, the generation of a considerable amount of solid particles is inevitable to ensure an economical-scale disilane production amount. When the space velocity is 109 $hr^{-1}$, the profit can be maximized with relatively less generation of solid particles when the reactor is operated at 5 bar and 440° C.

Test Example 1

Monosilane Conversion, Disilane Selectivity and Disilane Yield Depending on Reaction Temperature Monosilane conversion, disilane selectivity and disilane yield depending on reaction temperature were measured at a constant space velocity (109 $hr^{-1}$) using the apparatus for producing disilane of the present disclosure. The result is shown in FIGS. 11 and 12.

Figure 11:
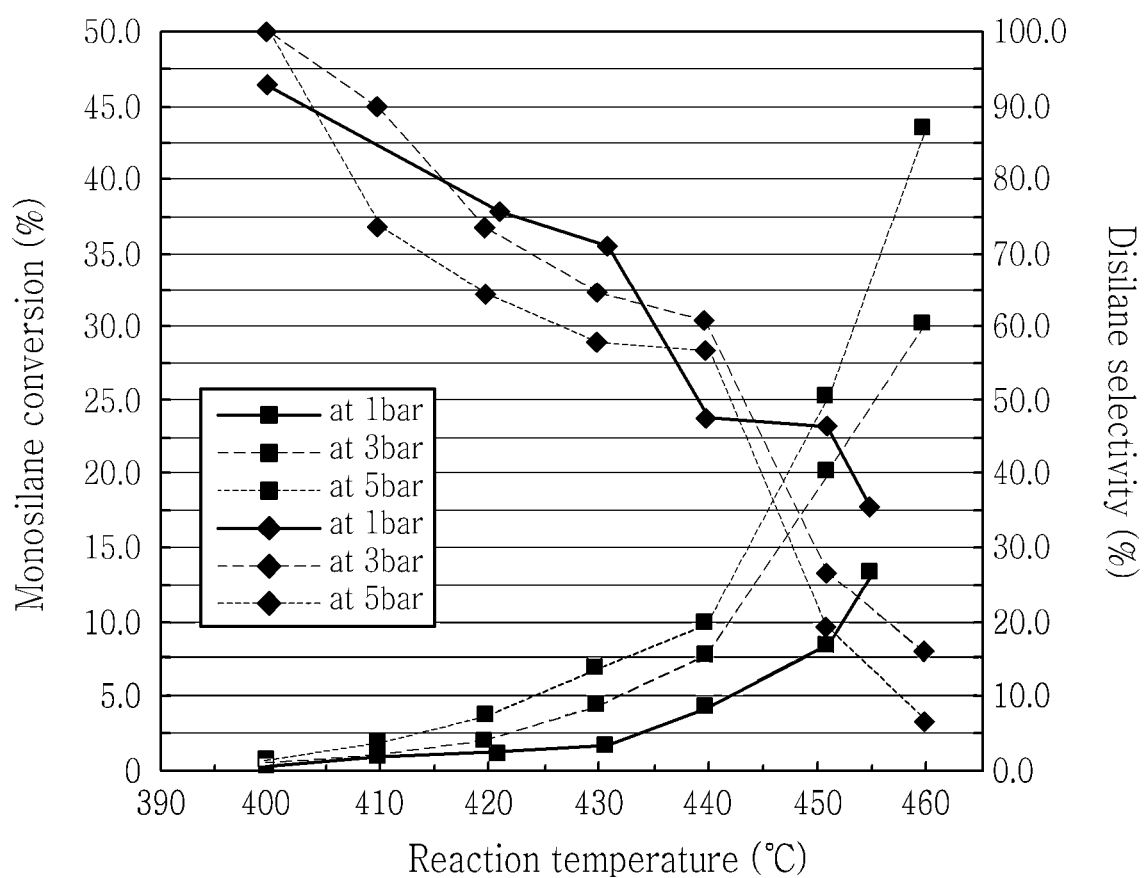
FIGS. 11 and 12 show monosilane conversion, disilane selectivity and disilane yield depending on temperature in a method for producing disilane according to an exemplary embodiment of the present disclosure.
Figure 12:
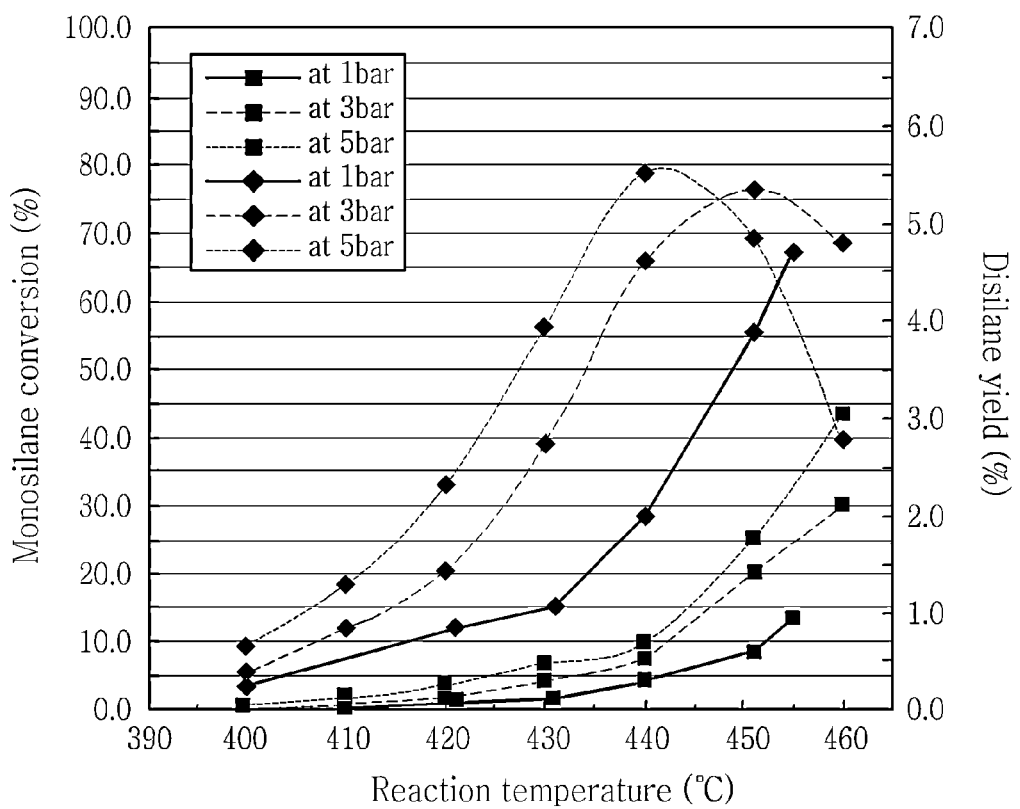

As seen from FIGS. 11 and 12, the monosilane conversion decreased gradually and approached 0 as the temperature decreased from 460° C. to 400° C. Meanwhile, the disilane selectivity decreased gradually and became too low the temperature increased from 400° C. to 460° C. A good disilane yield could be achieved when the temperature was in the range of 400-460° C. where both the monosilane conversion and the disilane selectivity were of proper levels. The disilane yield was the highest at about 440-450° C. and decreased gradually at higher or lower temperatures. Accordingly, it can be seen that a pyrolysis temperature of 400-460° C. is critical factor in the production of disilane.

Test Example 2

Figure 13:
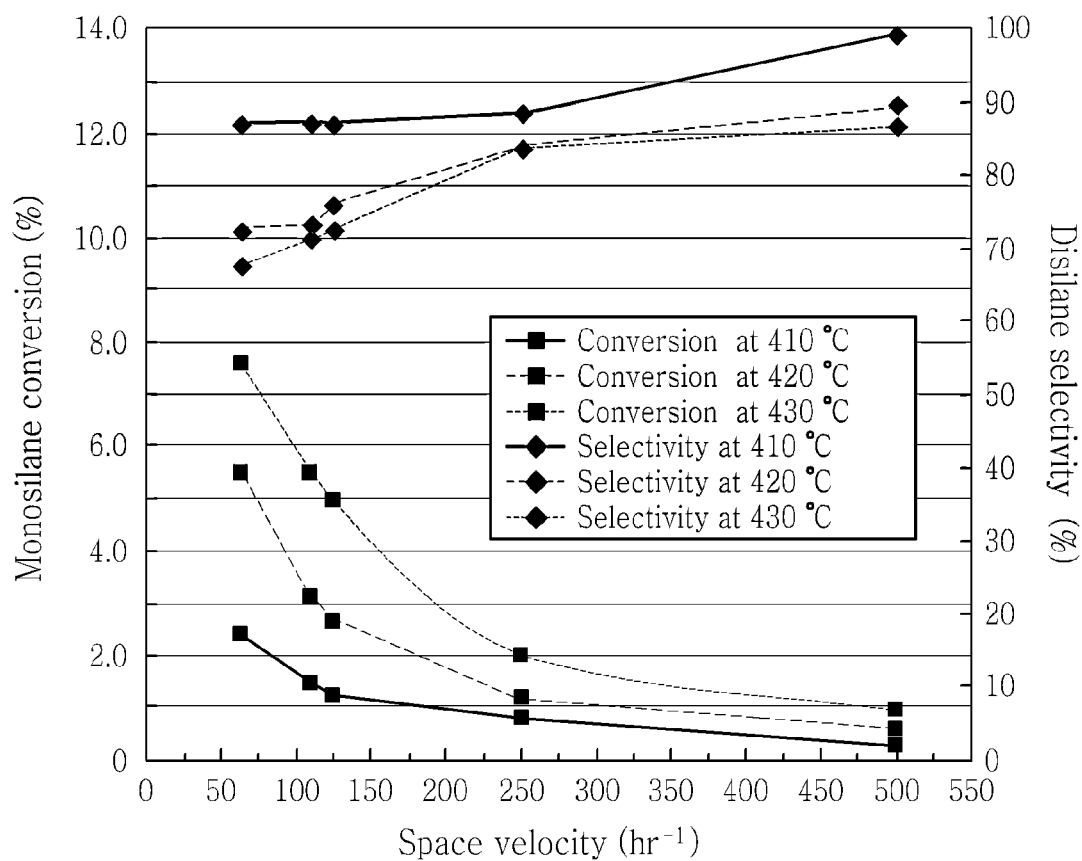
FIGS. 13 and 14 show monosilane conversion, disilane selectivity and disilane yield depending on space velocity in a method for producing disilane according to an exemplary embodiment of the present disclosure.
Figure 14:
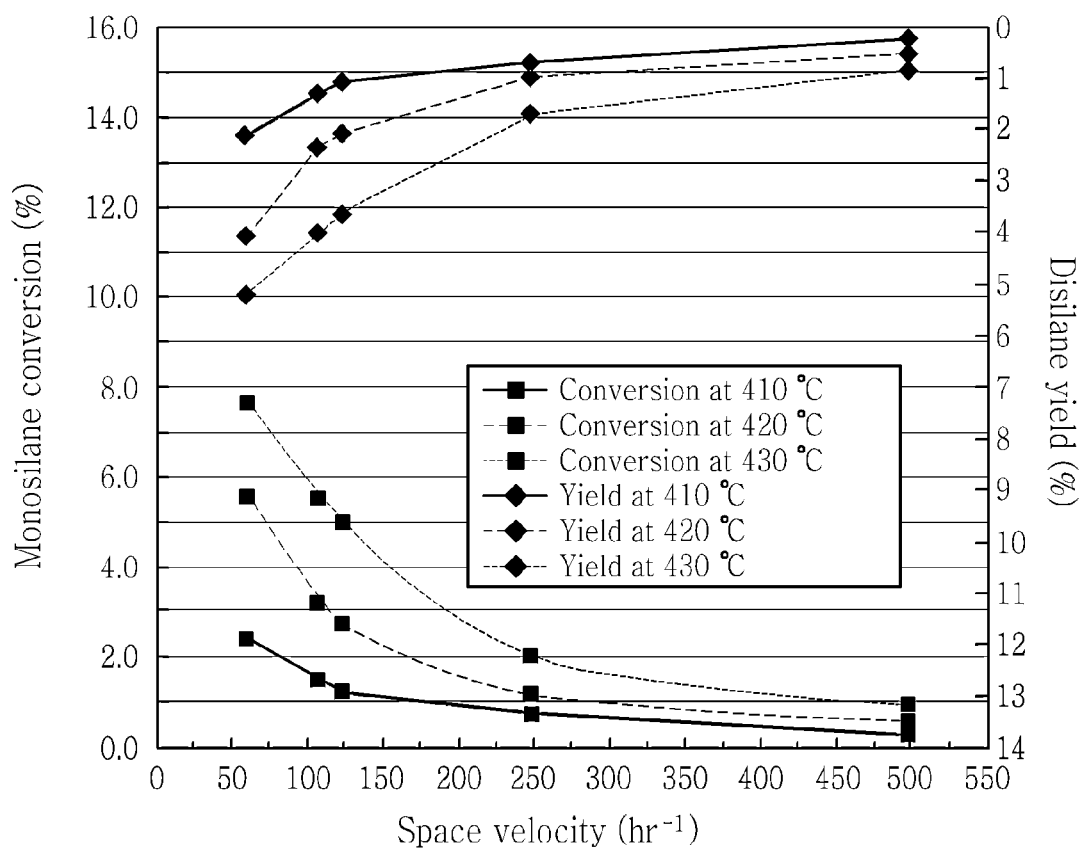

Monosilane Conversion, Disilane Selectivity and Disilane Yield Depending on Space Velocity Monosilane conversion, disilane selectivity and disilane yield depending on space velocity were measured at a constant reaction pressure (5 bar) using the apparatus for producing disilane of the present disclosure. The result is shown in FIGS. 13 and 14. As seen from FIGS. 13 and 14, the monosilane conversion decreased gradually and approached 0 as the space velocity increased from 60 $hr^{-1}$ to 500 $hr^{-1}$. Meanwhile, the disilane selectivity decreased gradually as the space velocity decreased from 500 $hr^{-1}$ to 60 $hr^{-1}$. A good disilane yield could be achieved when the space velocity was in the range of 60-500 $hr^{-1}$ where both the monosilane conversion and the disilane selectivity were of proper levels. Accordingly, it can be seen that a space velocity of 60-500 $hr^{-1}$ is a critical factor in the production of disilane.

What is claimed is:

1. An apparatus for producing disilane through pyrolysis of monosilane, comprising:
   a monosilane pyrolysis unit configured to pyrolyze monosilane and produce disilane and higher silanes, the pyrolysis unit having a pyrolysis temperature of 400-460° C., a pyrolysis pressure of 3-5 bar and a pyrolysis gas space velocity of 60-500 $hr^{-1}$;
   a solid particle removal unit configured to remove particles produced by the pyrolysis unit, the solid particle removal unit comprising a metal filter for removing particles exceeding 0.1 μm in diameter, and a ceramic support provided behind the metal filter for removing particles of 0.1 μm or smaller in diameter;
   a condensing unit configured to condense and liquefy, after said removal of particles, unreacted monosilane, and disilane and higher silanes with three (3) to seven (7) silicon atoms produced as results of the pyrolysis by the pyrolysis unit, excluding hydrogen from a gas with the solid particles removed by said solid particle removal unit;
   a first separation unit configured to separate monosilane from a mixture of the liquefied unreacted monosilane, disilane and higher silanes; and
   a second separation unit configured to separate disilane from the resultant mixture containing disilane and higher silanes with three (3) to seven (7) silicon atoms.

2. The apparatus for producing disilane according to claim 1, wherein the condensing is achieved by liquid nitrogen.

3. The apparatus for producing disilane according to claim 1, wherein the separation is achieved based on boiling point.

4. The apparatus for producing disilane according to claim 1, further comprising a heat exchange unit which controls temperature of a gas produced in the pyrolysis unit.

5. The apparatus for producing disilane according to claim 1, further comprising a storage tank which stores disilane.

6. A method for producing disilane, comprising:
   pyrolyzing monosilane at a pyrolysis temperature of 400-460° C., a pyrolysis pressure of 3-5 bar and a pyrolysis space velocity of 60-500 $hr^{-1}$;
   removing solid particles exceeding 0.1 μm in diameter from among solid particles in a gas generated during the pyrolysis using a metal filter and removing particles of 0.1 μm or smaller in diameter using a ceramic support;
   liquefying and collecting unreacted monosilane, and disilane and higher silanes as pyrolysis products, said liquefying excluding hydrogen from the gas with the solid particles removed;
   separating monosilane from a mixture of the liquefied unreacted monosilane, disilane and higher silanes with three (3) to seven (7) silicon atoms; and
   separating disilane and higher silanes with three (3) to seven (7) silicon atoms from the mixture with the monosilane removed.

7. The method for producing disilane according to claim 6, wherein the liquefying is achieved by liquid nitrogen.

8. The method for producing disilane according to claim 6, wherein the separation is achieved based on boiling point.

9. The method for producing disilane according to claim 6, further comprising controlling temperature of a gas produced after the pyrolysis of monosilane through heat exchange.

* * * * *